United States Patent [19]

Hassett

[11] Patent Number: 4,937,761

[45] Date of Patent: Jun. 26, 1990

[54] METHOD AND APPARATUS FOR ENHANCED SPEED GRAPHIC IMAGE PROCESSING

[75] Inventor: Christopher R. Hassett, Nashua, N.H.

[73] Assignee: Blueprint Technologies Incorporated, Nashua, N.H.

[21] Appl. No.: 117,208

[22] Filed: Nov. 4, 1987

[51] Int. Cl.⁵ .............................................. G06F 15/62
[52] U.S. Cl. .................................. 364/518; 340/727; 340/731
[58] Field of Search ................ 364/518, 519; 340/735, 340/790, 727, 730, 731; 358/22, 183; 400/71, 72

[56] References Cited

U.S. PATENT DOCUMENTS

| | | | |
|---|---|---|---|
| 4,529,978 | 7/1985 | Rupp | 340/735 X |
| 4,580,242 | 4/1986 | Suzuki et al. | 364/518 X |
| 4,712,185 | 12/1987 | Aoki | 364/519 X |
| 4,774,508 | 9/1988 | Kitahara et al. | 340/735 X |

OTHER PUBLICATIONS

Fundamentals of Interactive Computer Graphics, Foley and Van Dam, Addison-Wesley Publishing Company, 1982.

Primary Examiner—Gary V. Harkcom
Assistant Examiner—Mark K. Zimmerman
Attorney, Agent, or Firm—Weingarten, Schurgin, Gagnebin & Hayes

[57] ABSTRACT

Method and apparatus for graphic-image processing and font modification in laser printers, wherein the fonts and graphic images represented by a list of parameters are converted to discrete points, transformed to a new coordinate system wherein the font characters are scaled and rotated, and quantized according to the resolution of the printer, to provide the desired font and/or graphic image thereon. The present invention further selectively dithers are quantized image to enhance the resolution of the printer while accommodating picture elements which lie between the quantized positions of the laser printer. The quantized and dithered signal is separated into an image outline and a map of interior areas to be filled, which signals are processed to provide an outlined and a filled image and combined for receipt by the raster operator. The raster operator provides an image output data signal to the laser printer. Thus, the apparatus and method according to the present invention provides a significantly greater processing of font and graphic images while maintaining high quality.

14 Claims, 5 Drawing Sheets

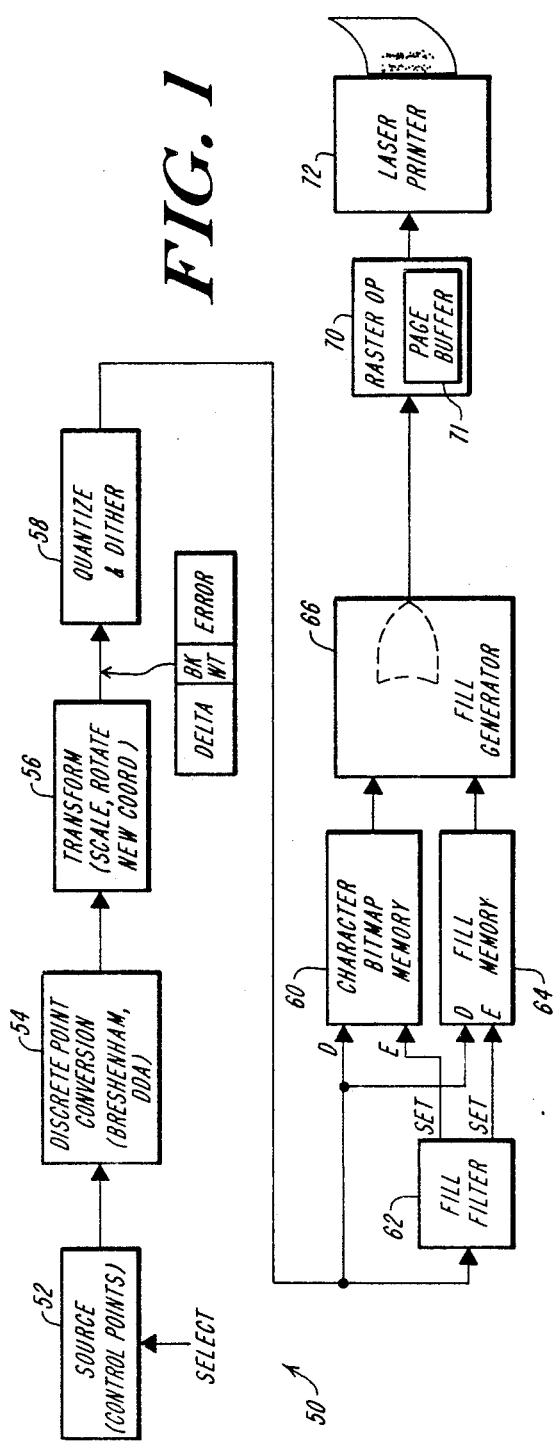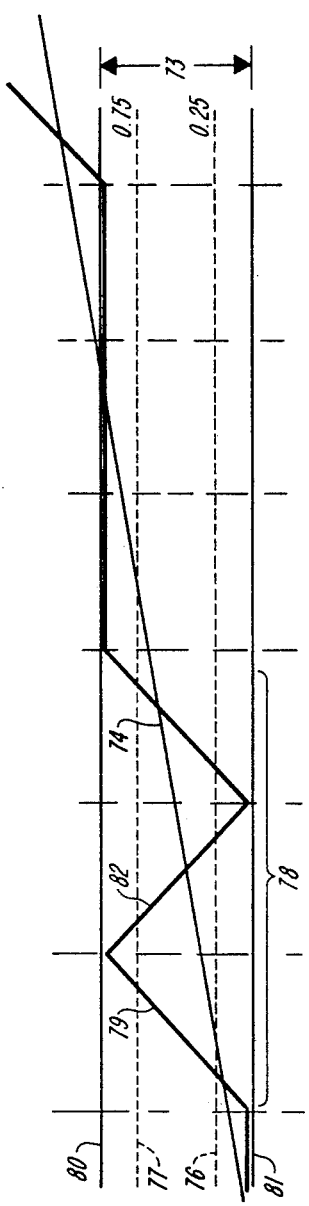

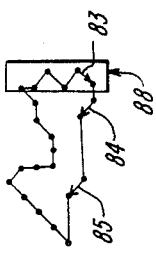
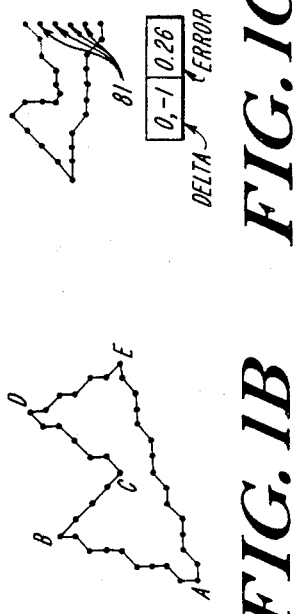
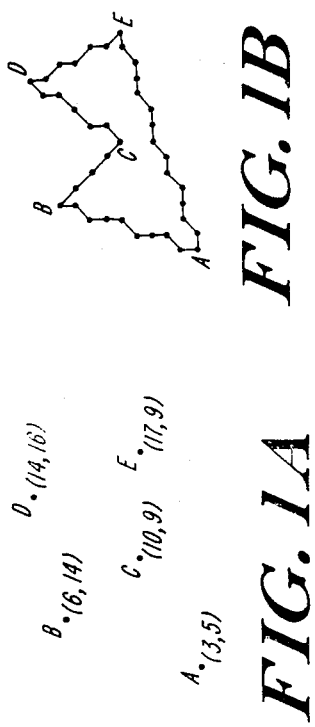
FIG. 1A   FIG. 1B   FIG. 1C   FIG. 1D   FIG. 1E   FIG. 1F   FIG. 1G

METHOD AND APPARATUS FOR ENHANCED SPEED GRAPHIC IMAGE PROCESSING

FIELD OF THE INVENTION

The present invention relates to graphics processing systems and, in particular, font modification and graphics processing apparatus and methods for font scaling and rotation of images printed on laser printers.

BACKGROUND OF THE INVENTION

The font modifications and graphics processing currently required to generate page documents from a repertoire of characters and images for printing on laser printers or any raster-oriented device represent a large computational load, the processing of which limits the performance of laser printers. A part of the problem of font character and image processing is maintaining typographic quality of the fonts during font scaling and rotation as related to the limited finite resolution (typically 300 dots per inch) of the laser printer, which results in a very slow page printing rate.

For instance, in a one mip processor and a 300-dot per inch output, previous real-time scaling and rotation systems typically provide a maximum of ten characters per second. by contrast, a currently available, medium-speed printer (20 pages per minute) printing 3000 character pages at full engine speed requires 1000 characters per second, a difference of two orders of magnitude. Furthermore, for higher resolution printers, this problem is further aggravated, accordingly. The difference of two orders of magnitude between the availability of characters from the font and graphics processors as compared to the capability of printers will further worsen as printer speed increases. Moreover, the problem is further exacerbated by higher resolutions and color printing. Aside from brute force approaches which suggest the implementation of multiple parallel signal processors, whose improved performance is directly related to the number of processors, the font and graphics processor cannot provide today the necessary data output nor are likely to attain the necessary performance while maintaining print quality in the future.

The particular process of the prior art font and graphic image processors retrieves an image signal from a source of font characters or graphic images wherein the image is described by arcs, lines or other control points which serve to describe the outline of the image. The resulting data from the source is transformed in full precision to control points related to a new coordinate system, wherein the image is rotated and scaled accordingly. Subsequently, the transform is "corrected" for misalignment to the lowest quantized value of the new coordinate system, wherein the boundaries are rounded either up or down. Furthermore, the corrected transformed signal is adjusted (according to hints included with the arcs and lines at the image source) to eliminate image distortions due to the grid correction. Next, the corrected transformed signal is converted to a sequence of points occurring at periodic intervals along the outline of the image. Subsequently, the image outline is selectively filled with points to provide a solid representation of the image or font character, and the resulting filled outline of the image is processed by a raster operator, which produces a stream of data, which when received by a printer, such as a laser printer, provides the desired image or font character. The image or font character produced on the laser printer according to this known process is a rotated and scaled representation of the image provided the source.

The above-mentioned graphic processing of font scaling and rotation is typically provided by "intelligent" printer controllers which incorporate microprocessor subsystems therein. However, computation such as distortion correction is difficult and computational intensive, requiring storage of additional information (the "hints") with each character. The conversion and correction of the transformed control points also requires significant computational power and time. Moreover, to create a solid image, processing speed is further hindered as by the image filling operations which require sorting of the outline points or employ other computably intensive operations. Therefore, the speed of the laser printer is severely limited by the speed of the image processing, and the speed of the image processing is limited by several interrelated factors, each of which, by present techniques, cannot be improved without adversely affecting another.

SUMMARY OF THE INVENTION

The present invention provides high-speed font modification and graphics processing. The font character or source image is converted to an image represented by a sequence of discrete points generated by a Breshenhan-like algorithm or a digital differential analyzer (DDA) processor. The resulting discrete point conversion of the source image is then transformed to the new coordinate system, wherein the scaling and rotation is implemented. The resulting transformed converted image is quantized to align with the minimum discrete positions of the new coordinate system, generally determine by the resolution of the printer. The quantized transformed converted signal is then processed to determined the outline of the image and the interior portion to be filled in two separate paths. The separately processed signals are then recombined and positioned by a raster operator in a desired position in the field of the printed page. The raster operator provides an image data output signal which is received by a laser printer or other display device providing an image according to a raster format, which provides a transformed representation of the source image.

Furthermore, according to the present invention, the quantization errors created by drawing a full precision line with a printer having a coarser minimum quantized "pen" position (the spacing between adjacent display device picture elements, or pixels) are reduced and the effective resolution of the printer is increased by selectively dithering the signal when quantized, to provide an image which appears to provide a value visually intermediate between the quantized minimum positions of the printer.

The present invention described above provides high performance while the technique maintains the quality necessary in the industry. The total time for processing each image is related to the number of points provided in the basic character outline after the discrete point conversion. Furthermore, the present invention provides pipeline processing of the information to minimize the processing time. The present invention uses incremental computation for all processing steps (discrete point conversion, transformation, quantization and dithering, as well as character outline and fill processing) as opposed to the current techniques which use whole number computations for all processes except for scan conversion. Therefore, according to the present invention, the complex procedural computations, common in the prior art, are eliminated, and higher process speed is maintained by parallel (pipeline) computation while maintaining a high quality font or image.

BRIEF DESCRIPTION OF THE DRAWING

These and other features of the present invention will be better understood when reading the following detailed description, taken together with the drawing, wherein:

FIG. 1 is a block diagram of the system and process according to the present invention;

FIGS. 1A-1G are graphic representations corresponding to various blocks of the process and apparatus as illustrated in FIG. 1;

FIG. 2 is a graphical representation of a magnification of a dithered line portion traversing the quantized interval of the laser printer;

DETAILED DESCRIPTION OF THE INVENTION

Figure 3:
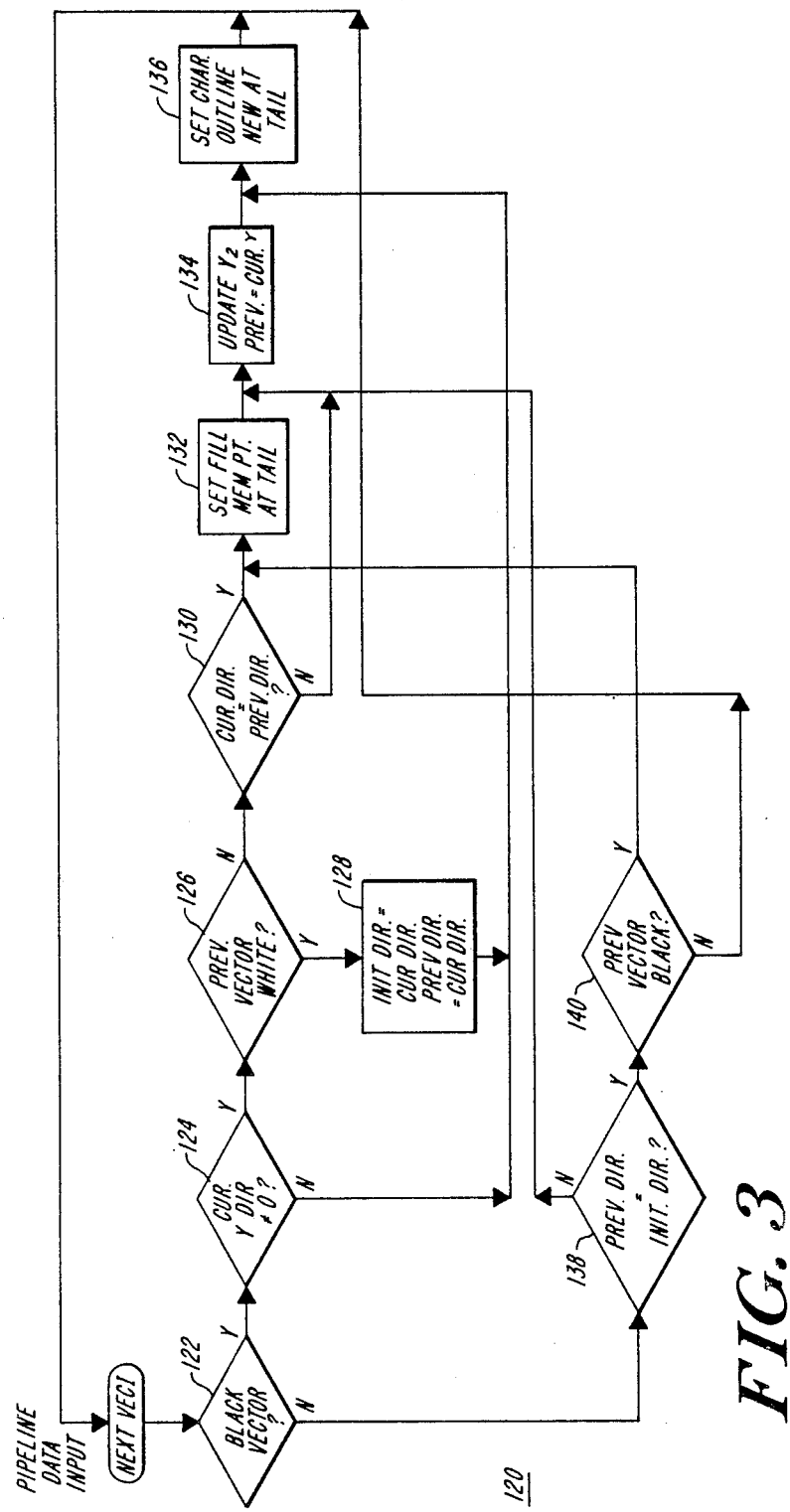
FIG. 3 is a block diagram of the fill filter shown in FIG. 1.

The method and apparatus according to the present invention is shown in the block diagram 50 of FIG. 1. The individual blocks in FIG. 1 correspond to particular hardware elements providing the labeled functions therein. Moreover, the particular functions may also be implemented as a particular step in a process, wherein the process is implemented in one or more serial processing elements, such as a microprocessor. Therefore, except where otherwise provided in this specification, the present invention described by the block diagram 50 may be accordingly implemented by the techniques known to one of skill in the art. A particular image or font character is provided by the source 52, wherein the image is specified by a sequence of controlled points. The control points, listed below in Table 1, comprise the starting x and y coordinates, the slope (m) and the length of the line (run), which when plotted are shown in FIG. 1A. However, other sources providing other mathematical primitives to represent the character or image, such as Bezier points or spline data as discussed in *Principles of Interactive Computer Graphics,* William M. Newman and Robert F. Sproull, McGraw Hill Book Co., N.Y., NY 1979 2nd Edition are, incorporated by reference.

TABLE 1

| L | x | y | m | run |
|---|---|---|---|---|
| L | 3 | 5 | 3 | 3 |
| L | 6 | 14 | −1.25 | 4 |
| L | 10 | 9 | 1.75 | 4 |
| L | 14 | 16 | −2.33 | 3 |
| L | 17 | 9 | −0.286 | −14 |

The source 52 image defined by Table 1 and graphically illustrated in FIG. 1A is converted to a sequence of discrete points by a Digital Differential Analyzer (DDA) processor described in *Principles of Interactive Computer Graphics,* William M. Newman and Robert F. Sproull, McGraw Hill Book Co., N.Y., NY 1979 2nd Edition and in Digital Differential Analyzers, George F. Forbes, 4th Edition, incorporated by reference, programmed to provide a Bresenham-like algorithm (Appendix I) or other similar algorithm to convert the image at block 54 to a sequence of delta vectors having a specific (unit) length value and a direction value defined as one of eight possible directions (at 45 degree intervals from the originating point). The resulting image of FIG. 1B provides an outline of the boundary of the image described by Table I.

The converted image is transformed at block 56, to transform coordinates, resulting in an image scaled and rotated as desired. Such transformation involves an incremental algorithm using a DDA processor discussed above, or other algorithms known in the field of graphic computation. Note that the resolution of the transformed image is the same as the converted image of FIG. 1B, and includes the same coordinate system.

The transformed image shown in FIG. 1C comprises a right edge boundary having the delta direction values of 0, −1 which corresponds to the printer or raster display "pen" displacement relative to a starting point, in this case the upper right-hand corner of the image in FIG. 1C. The first (left) component of the delta term 87 corresponds to the relative horizontal motion, which in this instance, is zero. The second component corresponds to the vertical displacement, which in this example (−1), where each delta unit corresponds to the next lowest quantized interval of the printer image. The transformed points 87 also have an associated error term of 0.26 quantization interval, which, according to another aspect of the present invention, is combined with a dither signal at block 58 to further augment the perceived resolution of the printed graphic image and reduce quantization errors.

According to the present invention illustrated in FIG. 2, when a transformed (true) line is in excess of the 0.25 threshold 76 of the minimum quantization interval 73 (of the laser printer), a "dithered" line segment 78 described below is drawn. Once the transformed line exceeds 0.25, the dithered signal is provided and continues so long as the transformed converted signal is between 0.25 and 0.75 of thresholds 76 and 77, respectively, of the minimum resolution interval of the laser printer. The dithered or alternating of the line segment is terminated at the quantized position nearest the numeric value when the numeric value of the subsequent line portion is within the thresholds adjacent said nearest quantized value and the next quantized value. Thus, when the transformed converted image point is less than 0.25, the value printed corresponds to the nearest quantized interval of the laser printer. Similarly, when the transformed converted image point has a value of at least 0.75 of the minimum quantization interval of the laser printer, the printed point is rounded to the next highest minimum quantization interval of the laser printer.

A dithered line portion 78 is provided when the true transformed converted signal 74 lies within the range of 0.25 to 0.75 minimum resolution interval in the present embodiment. The dithered line portion 78 includes a line segment 79 drawn to the next closest minimum quantization interval 80 at an oblique angle, such as 45°. Other threshold values may be selected. If the portions of the subsequent true transformed converted line continues to have a value within the range of 0.25 to 0.75 of the minimum quantization interval, a subsequent oblique line 82 is drawn to the other closest minimum quantization interval 81, and continues to alternate between the most approximate minimal quantization intervals (80 and 81) so long as the calculated (true) transformed numeric value lies within the range of 0.25 to 0.75 and in this particular embodiment of the invention, including 0.75 of the minimum quantization interval. However, even if the calculated transformed value lies within the range of 0.25 and 0.75, an oblique line is not drawn away from a particular minimum quantization interval (i.e., dithering is inhibited) if the subsequent transformed converted image value is rounded to that particular minimum quantization interval (i.e., not dithered). Thus, the enlarged example of FIG. 2 conforms to the portion of the image within the enclosed box 88 of FIG. 1D, which corresponds to the output of the quantization and dither block 58.

The resulting quantized and dithered signal is received by a character bit map memory 60, typically comprising at least a 256 ×256 random access memory (RAM) which, as illustrated in FIG. 1E, retains an image identical to the dithered signal shown in FIG. 1D. The image provided by the quantize and dither block 58 is also received and filtered by a fill filter 62 and subsequently received by a fill memory 64, also a 256×256 bit memory, which provides only the boundary points which determine the beginning and end of the filling of the character outline in the character memory 60 by a bit fill generator 66, which in combination with the signals stored in the character and bit memory map 60 is received by the raster operator 70 to produce an image data signal which is stored in a page buffer 71 comprising a bit-map memory. The page buffer provides an image data output signal which is received by printer or other raster display device 72 to provide the printed output image such as shown in FIG. 1G.

The fill memory comprises the same image as in the character bit map memory 60 except when the fill filter 64 determines that the delta direction has changed for a single bit over the previous drawn bit. Thus, the fill memory avoids beginning a fill sequence for a singular point element, such as 91 in FIG. 3A and only contains elements having at least two horizontally (or in the direction of fill) adjacent extending points, such as a horizontal raster fill line beginning with point 92 in FIG. 3B.

Figure 3A:
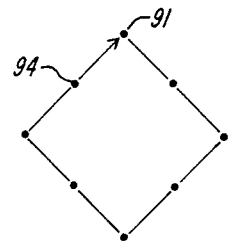
FIGS. 3A and 3B are graphic representations of the signal vectors determined by the fill filter according to FIG. 3.

The fill filter 62 implemented in a microprocessor or hardware logic is operable according to a flow chart 120 shown in FIG. 3. The image signal data stream from the quantizer and dither block 58 includes a single bit indicating either a white or a black vector and is received at step 122 which determines if the vector is a black vector. A black vector comprises an image data vector which is represented by a contrasting [dark] line on the display [white background], and a white vector is written on a previously stored point and is a final piece of data provided by the transform block 56 and thus also by the quantizer and dither block 58 to complete the outline of the image or font character. In the flow chart 120, if the present vector is a black vector, according to the test at step 122, the y delta value is tested at step 124 which, if nonzero, a subsequent test is performed at step 126 to determine if the previous vector was a white vector, indicating the necessity of setting initial conditions if true. If the previous vector was a white vector, the initial conditions are set at step 128 wherein the initial y direction is established as the current y direction, and the previous y direction is set equal to the current y direction. Note that if the present vector is a horizontal vector the y value is 0 and initial direction is undefined and the previous direction is 0. If the y value is determined to be equal to 0 at step 124, the fill point in the fill map memory 64 is not set, and a point corresponding to the outline of the image is set in the character memory 60 at step 136. If the previous vector was not a white vector, the current y direction is compared to the previous y direction and, if equal, a memory location is set in the fill memory 64 at step 132 (such as points 83' and 85' from vectors 83 and 85, respectively, of FIGS. 1D and 1F, and the previous y direction is set to the current y direction at step 134 and the point in the outline memory is set at step 136. However, if the current y direction does not equal the previous y direction (such as for vector 84), a point in the fill memory 64 is not set and the y direction is updated at 134 and an outline point is set in the character bit-map memory 60 at 136. If the outline of the image is completed, the present vector will test as a white vector at step 122, whereupon, if the previous y direction is equal to the initial y direction as determined at step 138 and if the previous vector is black as determined by step 140, a fill point is set in the character bit-map memory 60 at step 132. However, if the previous vector was not black or the previous y direction does not correspond to the initial y direction, the fill point is not set, but the y direction is updated at step 134.

Figure 3B:
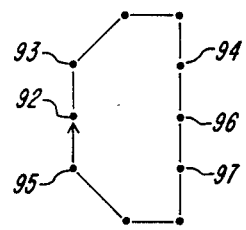

Thus, according to the present invention, as illustrated in FIG. 3B for an image beginning at the point 92 and having a first black vector extending upward therefrom, the image is outlined by successive vectors including a black vector originating at point 95. To indicate a closed image, a subsequent white vector is originating at point 92 after the final black vector originating at point 95, which according to steps 122, 138 and 140 result in the setting of the bit in the fill memory at point 92, which according to the convention of the present invention the bits set in memory correspond to the tail of the vector. Therefore, according to the operation of the fill filter of FIG. 3, all points in the image of FIG. 3B will be stored in the character bit-map memory 60 which has an outline of the image, but only points 92, 93, 94, 95, 96 and 97 will be stored in the fill map memory 64.

Figure 4:
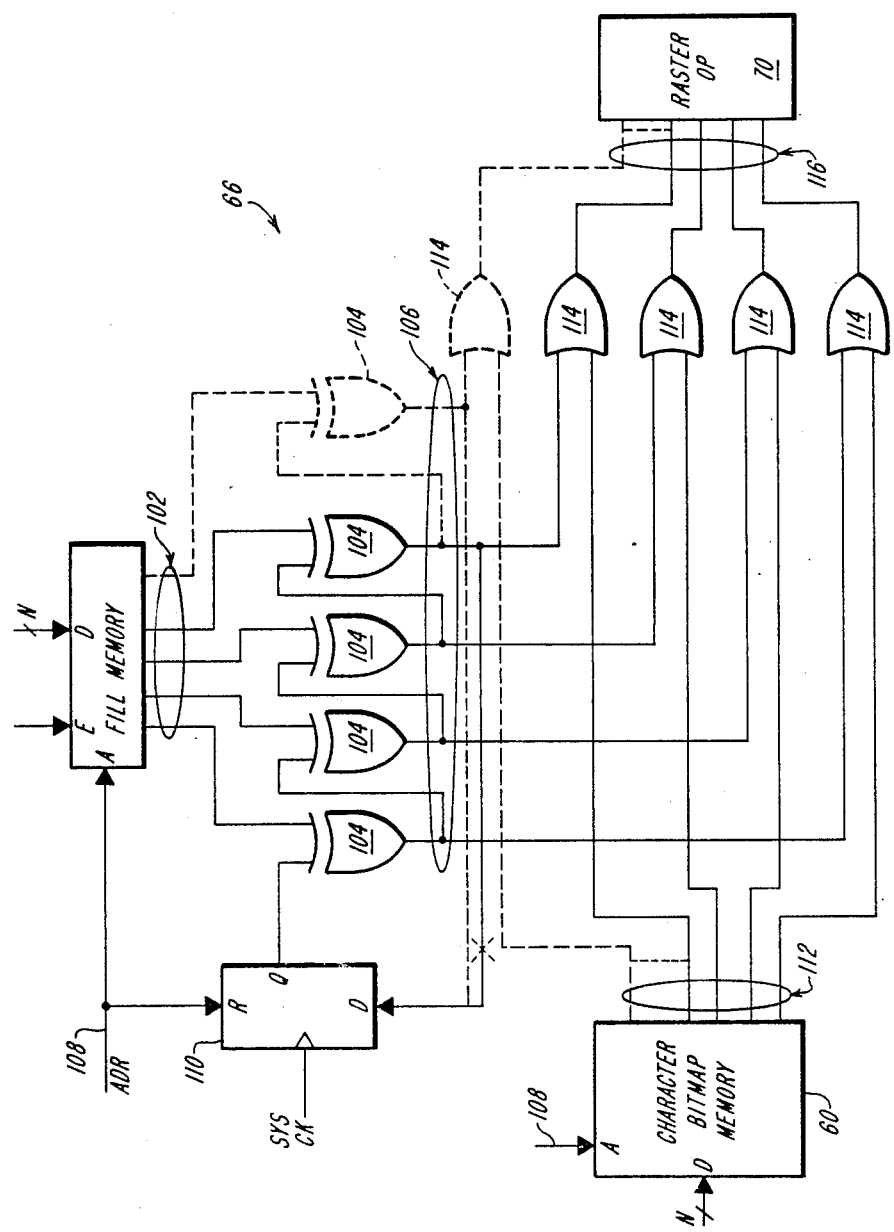
FIG. 4 is the functional block diagram of the combination of image signals from the character bit map and fill memory of FIG. 1.

The pixel fill generator 66 is shown in more detail in FIG. 4, wherein the fill memory 64 provides a parallel output signal, herein represented for illustration by four parallel signals 102 which are received by separate OR gates 104 which provide parallel fill pixel outputs at leads 106. When, the fill memory 64 has two (or more) sequential word outputs, which correspond to a single horizontal line section of the bit map when sequentially addressed by address signals on the leads 108, the leftmost "one" corresponds to a point along the left image edge while the right-most "one" corresponds to a point along the right-most inner edge. For example, for two horizontally contiguous words 1000 0010, which would be provided sequentially by the fill memory 64 at leads 102 as words 1000 and 0010, the Exclusive OR gates 104 provides, in sequence, 1111 1100, wherein the "one" bits correspond to pixels filled within the boundary described by the signals from the fill memory 64. To define the left-most edge, a single flip-flop 110 is reset at the left-most edge, whereafter the flip-flop 110 receives a signal from the right-most of the Exclusive OR gates 104. The fill data provided by the Exclusive OR gates 104 on leads 106 is logically combined with the character outline signal (1000 0010) provided by the character memory 60 on leads 112 by four separate OR gates 114 to provide a composite filled signal (1111 1100) at leads 116 to the raster operator 70. This process is repeated for other horizontal line segments to complete the filling of the image stored in the memories 60 and 64.

The raster operator 70 responds to the character outline signals in the character bit map 60 and the fill pixels generated by the fill generator 66 in response to the data in the fill memory 64.

The raster operator 70, which may comprise a separate processor with assoCiated memory or a specific function integrated circuit such as that available from National Semi-Conductor or the Texas Instrument Part No. 34010, or other raster operators known in the art of graphic processing, moves the produced image to the desired position in the field of the printed page as stored in the large page buffer memory array 71, and other functions as selected. An example of the printer 72 is a laser printer such as the Ricoh 4081 manufactured by Ricoh, Japan, and other similar printers having the capacity to produce an image when given an image, defined by a memory-mapped page buffer of memory having a bit-mapped image or other selected format produced by the raster operator 70.

Substitutions and modifications made by one of skill in the art are considered to be within the scope of the present invention. For instance, selection of different dither thresholds, memory sizes or the selection of a particular processing sequence within any block element or stop different than that described herein is within the scope of the present invention, which is not to be limited except by the claims which follow.

3.0 THEORY OF OPERATION

Before describing the operational details of the BP100A, it is important to note that the BP100A processes all object outlines in the same manner. A "character" outline is a specific instance of a graphical object. All references to "character" manipulations in this document can therefore be applied to any graphical object for which there is a BP100A format outline description.

3.1 Coordinate Transformation

The BP100A provides for geometric coordinate transformations. An input point (two dimensional row vector [x y]) operated upon by the BP100A's transformation matrix produces a transformed point (two dimensional row vector [x' y']) as follows:

$$[x'\ y'] = [x\ y] \begin{bmatrix} a & b \\ c & d \end{bmatrix}$$

The matrix elements a,b,c,d can be loaded into registers contained in the BP100A. The two dimensional input row vectors ([x y]) is obtained in one of two ways:

(1) As points along the outline of a character. These are accessed automatically from the BP100A Font Memory when transformations on fonts are requested.

(2) End-points of lines and arcs. These are provided by loading BP100A registers, and then calling for line or arc generation. The actual line or arc generated is that connecting the two transformed points ( [x' y']) as determined by the matrix elements a,b,c,d previously loaded.

APPENDIX 1

The order of concatentatiõn of the transoformation matrices determines the order in which the transformation operations are performed. Examples of transformation matrices are:

(1) Scaling $$S = \begin{bmatrix} Sx & 0 \\ 0 & Sy \end{bmatrix}$$

Anamorphic Scaling if $Sx \neq Sy$

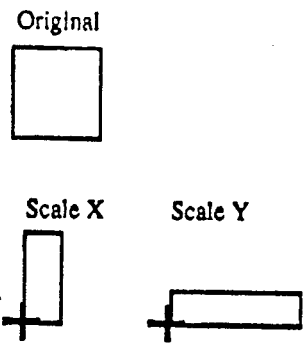

Original

Scale X   Scale Y (2) Rotation $$R = \begin{bmatrix} \cos\theta & \sin\theta \\ -\sin\theta & \cos\theta \end{bmatrix}$$

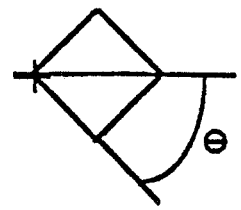

(3) Obliquing $$O = \begin{bmatrix} 1 & 0 \\ \tan\phi & 1 \end{bmatrix}$$

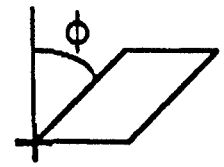

Concatenation of matrix operations are possible such as:

(1) Rotation followed by obliquing $$[R][O] = \begin{bmatrix} \cos\theta + \sin\theta\tan\phi & \sin\theta \\ -\sin\theta + \cos\theta\tan\phi & \cos\theta \end{bmatrix}$$

(2) Obliquing followed by rotation $$[O][R] = \begin{bmatrix} \cos\theta & \sin\theta \\ \tan\phi\cos\theta - \sin\theta & \tan\phi\sin\theta + \cos\theta \end{bmatrix}$$

What is claimed is:

1. A graphics processor for use with a raster display device, comprising:
    means for selectively providing a plurality of math primitives defining a two-dimensional image according to a first coordinate system having a first scale and first rotation of said image;
    discrete point conversion means receiving said plurality of math primitives and providing a first converted image having representative points occurring at regular intervals according to said first coordinate system;
    transform means receiving said first converted image and providing a selected transformation matrix value defining a second converted image and resulting in a second scale and second rotation of said image according to a second coordinate system;
    quantizations means receiving said second converted image and providing a third converted image; and
    image output means for providing image output data according to said third converted image said image output means having a minimum quantized spatial resolution, wherein
    said raster display device receives said image output data and provides a scaled and rotated graphical representation of said selected two-dimensional image.

2. The graphics processor of claim 1, wherein said raster display device comprises a laser printer.

3. The graphics processor of claim 1, wherein said discrete point conversion means comprises a processor means including instructions therein in accordance with a Bresenham algorithm to generate said representative points in response to said two-dimensional image according to said plurality of math primitives.

4. The graphics processor of claim 1, wherein said image output means has a spatial resolution, and said second coordinate system corresponds to a coordinate system of said image output means, and has substantially the same quantized spatial resolution as said image output means.

5. The graphic processor of claim 4, wherein said image output means comprises a printer.

6. The graphics processor of claim 1, wherein said image output means further comprises:
    output storage means for storing an outer boundary of the third converted image;
    fill generator means for providing a uniform change in a current display background providing a filled image according to said stored outer boundary of said third converted image; and
    means for combining said stored outer boundary of the third converted image and said filled image to provide a solid image.

7. The graphics processor of claim 6, wherein said fill generator comprises:

means for providing a sequence of fill points between first and second points in pairs of points to provide said filled image.

8. The graphics processor of claim 7, wherein said image is converted to a uniform intensity monochrome image and, said filled image comprises a black image on a white background.

9. The graphics processor of claim 1, wherein the third converted image is quantized to a coordinate system having a minimum resolution larger than the resolution of said second converted image.

10. The graphics processor of claim 1, wherein
said first scale comprises a normalized scale which provides standardized uniform character height and width, and
said first rotation comprises a coincidence of location, according to said first coordinate system, of said math primatives of a plurality of two-dimensional images.

11. A method of graphically displaying a line represented by a sequence of coordinate position values in a display device having a quantitization of display positions of a resolution greater than a resolution of the sequence of coordinate position values of the line, comprising the steps of
determining a first and a second threshold between a first and second quantized display position, respectively;
providing an output value equal to said first quantized display position when a coordinate position value of a segment of said line is greater than or equal to said first quantized position and less than said first threshold;
providing an alternating output value when the coordinate position value of said segment of said line is equal to or greater than said first threshold and less than or equal to said second threshold; and
providing an output value equal to said second quantized position when the coordinate position value of said segment of said line is greater than said second threshold, wherein
said alternating output value comprises a signal representing an oblique line on the display device having quantized display positions, extending from one of said first and second quantized position to the other of said first and second quantized position for subsequent coordinate position values, and
said alternating output continues for subsequent coordinate position values when said coordinate position values are between said first and second thresholds.

12. The method of claim 11, wherein said oblique line extends from one of said first and second quantized display position to the other of said first and second quantized display position at angular intervals of odd integer multiples of 45°.

13. The method of claim 11, further including the step of
terminating the alternating output value at a quantized display position nearest the coordinate position value when a coordinate position value of a subsequent segment of said line is within said first and second threshold of an adjacent quantized display position value nearest the coordinate position value and a next quantized display position.

14. For use in a graphic processor wherein a graphic image is represented by a sequence of displacement delta signals having x and y direction, a method of generating a filled image comprising the steps of:
providing a bit-mapped outline of an image;
determining if a present displacement delta signal has a nonzero y component;
determining if a present displacement delta signal y component differs from an immediately preceding displacement delta signal y component;
storing an image data point if the present displacement delta signal has a nonzero y component and differs from the immediately preceding displacement delta signal y component, wherein said data point value provides a beginning point of each said displacement delta signal; and
combining the stored image data point with the bit-mapped outline.

* * * * *

UNITED STATES PATENT AND TRADEMARK OFFICE
CERTIFICATE OF CORRECTION

PATENT NO. : 4,937,761
DATED : 6/26/90
INVENTOR(S) : Hassett

It is certified that error in the above-identified patent and that said Letters Patent is hereby corrected as shown below:

On the title page:

| | | |
|---|---|---|
| [73] Assignee | delete "Blueprint" | insert --Bluepoint-- |
| [57] Abstract, line 09 | delete "are" | insert --the-- |
| col. 02, line 33 | delete "determine" | insert --determined-- |
| col. 02, line 35 | delete "determined" | insert --determine-- |
| col. 07, line 12 | delete "assoCiated" | insert --associated-- |

Signed and Sealed this

Nineteenth Day of November, 1991

*Attest:*

HARRY F. MANBECK, JR.

*Attesting Officer*  *Commissioner of Patents and Trademarks*